Patented Nov. 14, 1933

1,935,596

UNITED STATES PATENT OFFICE 1,935,596

METHOD OF INCREASING THE FOOD VALUE OF FROZEN COMESTIBLES

Ernest D. Fear, Kansas City, Mo., assignor to De-Raef Corporation, Kansas City, Mo., a corporation of Delaware No Drawing. Application October 1, 1931
Serial No. 566,319

13 Claims. (Cl. 99—16)

My invention relates to a process for improving the quality and food value in frozen comestibles and a product for use in the same. More particularly, my invention contemplates a process for building up the percentage of solids in ice cream and a product for use in my process.

This invention is an improvement of the invention described and claimed in my co-pending application, Serial No. 554,381, filed July 31, 1931.

It has been proposed by many that a frozen comestible, such as ice cream, for example, be enriched by various milk concentrates or powders available to the industry in order to raise the food value and "creamy" taste of ice cream. When this has been attempted it has been found that the resulting ice cream contained small hard crystals, giving this product the appellation of "sandy" or "gritty". An analysis of the crystals shows that they consist chiefly of lactose or milk sugar. Reasoning inductively from this knowledge led many inventors to believe that if the lactose were eliminated a "sandy" ice cream could be avoided. I have found that, not only is an attempt to eliminate lactose impractical, but it deprives the ice cream of a healthful and beneficial milk product. Furthermore my investigation from an analytical or deductive approach of the problem has resulted in my discovery of the source of error and in my invention of a process for achieving an ice cream exceedingly rich in milk-solids-not-fat without the production of any crystals or "sandiness" and of a product for use in carrying out this process.

The average composition of milk is as follows:

| | Percent |
|---|---|
| Water | 87.17 |
| Fat | 3.69 |
| Casein | 3.02 |
| Albumin | .53 |
| Sugar | 4.88 |
| Ash | .71 |
| Total solids | 12.60 |
| Milk-solids-not-fat | 8.85 |

The butter fat present in milk is not in solution but in a colloidal form consisting of the butter fat in the dispersed or internal phase. The casein in the milk is that constituent of the milk which functions to act as a protective colloid which prevents the less stable colloidal butter fat from flocculating. The lactose or milk sugar is present in solution as a crystalloid. When a solution is super-saturated with lactose or milk sugar, a disturbance in the equilibrium will result in the precipitation of the small hard crystals of lactose or milk sugar. When a protective colloid is present, however, it has the property of holding in suspension these small crystals and preventing their precipitation and subsequent coagulating to form hard crystals.

The minute particles of casein in milk are all charged with small charges of electricity having the same sign. Inasmuch as like repels like, each minute particle of casein will repel every other particle, the particles will assume a violent motion, resulting in what is known as the Brownian movement. An electrolyte which will ionize to produce ions having an opposite charge from that present in the minute particles of casein will neutralize the casein particle charges and deprive them of the factor which produces the Brownian movements. When this results, a phenomenon takes place which is termed flocculation, that is, the casein will separate out, as will the less stable butter fat colloid. When the flocculating agent is not strong enough to coagulate the casein, though sufficiently ionized to neutralize the butter fat charges, no flocculation will take place due to protective action of the more stable colloidal casein, which will hold the less stable colloid in suspension. Certain substances having an ion concentration of the same sign as the colloid will render it more stable and prevent flocculation. These substances are known as deflocculating agents, inasmuch as they increase the colloidal properties and stability of a colloid. It is obvious from the foregoing discussion that the lactose or milk sugar crystalloids will be held in suspension by a colloid.

At the present time in the manufacture of ice cream the universal procedure is to form a mix, a typical composition consisting of cream, milk, milk powder, or condensed, evaporated or superheated condensed milk, cane or beet sugar or glucose, gelatine and eggs. A typical mix will have the following composition:

| | Percent |
|---|---|
| Butter fat | 12.00 |
| Milk-solids-not-fat | 12.00 |
| Sugar | 14.00 |
| Gelatine | .50 |
| Total | 38.50 |

It is to be noted that, exclusive of water, the percentage of substances having a food value present in the ice cream mix is only 38.50%.

In practice, during the manufacture of ice cream, the mix is made in a mixing vat which will agitate the various constituents and pasteurize the mix at the same time. After pasteurization, the ice cream mix is processed through a viscolizer or homogenizer, and cooled, which insures that the various elements in the mix are well distributed throughout. The mix is then allowed to "age" at a low temperature. This ageing process is necessary in order to enable the mix to acquire whipping qualities. The ageing process will take from 12 to 48 hours. During this time, the colloidal elements of the mix have become sufficiently deflocculated so that the mix may then be manufactured into ice cream in the freezer. The freezer consists of a mechanical agitator which will whip it into a foamy, smooth mass and incorporate therein a large percentage of fine air cells. While this whipping is going on, the mix is subjected to low freezing temperatures so that an ice cream will result. The amount of air which can be incorporated into the mix, in other words, the increase in volume that will take place, depends upon the colloidity and whipping qualities of the mix and on the total solids content. It is obvious that a mix having a high total solids content and greater surface tension is capable of holding a greater qauntity of minute air cells in suspension than a mix having lesser whipping qualities and a lower total solids content. It is obvious, further, that the greater the amount of solids present in an ice cream mix, the higher will be the food value of the ice cream without a dimunition of the desired smooth body and texture.

One object of my invention is to provide an improving agent which may be added to an ordinary milk powder or milk concentrate for use in making an ice cream mix which will give colloidal and whipping properties to the mix.

Another object of my invention is to provide an improving agent which may be added to an ordinary ice cream mix which will enable the use of a higher total percentage of milk-solids-not-fat without the danger of producing a sandy or gritty ice cream.

Another object of my invention is to provide an ice cream mix which will have sufficient colloidal or whipping qualities so that it may be used for making ice cream without the necessity of "ageing" the mix whereby a continuous process is achieved.

A further object of my invention is to provide an improving agent which will enable the percentage of milk-solids-not-fat to be greatly concentrated in a mix which may be frozen and extruded for use in a comestible bar which may subsequently be chocolate coated.

Other objects of my invention will appear from the following description.

In general my invention contemplates the provision of an improving agent which consists of a dextrose and a deflocculating agent. Inasmuch as both calcium and magnesium occur naturally in milk, I prefer to use magnesium oxide or calcium oxide as my deflocculating agent. It is to be understood, however, that other deflocculating agents may be used in carrying out my invention without departing from the spirit thereof.

More particularly, I take from 10 to 100 parts of dextrose and add thereto from 1 to 2 parts of calcium oxide or magnesium oxide. Another advantage of using calcium oxide or magnesium oxide as my deflocculation agent is that their alkaline reaction will serve to neutralize any lactic acid which may be present in the mix. I have found that lactic acid acts as a flocculating agent which will tend to break down the colloidal qualities naturally present in the mix and tend to precipitate the lactose or milk sugar in the form of crystals and is thus one of the chief causes of sandy ice cream. Accordingly, the amount of calcium or magnesium oxide may vary depending upon the acidity of the ice cream mix which is to be treated. I may take an ordinary milk powder which is made out of milk, skim milk, partly skimmed milk or sweet buttermilk, and add thereto an amount of my improving agent varying from 6 to 60 percent. It is to be understood that I do not wish to be limited to any particular percentage of improving agent which I may add to an ordinary milk powder. The amount to be added will vary depending upon the particular mix to which the resulting modified milk powder is added.

My improving agent may be added to the usual ice cream mix in order to enable it to be made into ice cream without the necessity of ageing it.

My improving agent may be used in a mix to enable ordinary milk powders to be added thereto in order to build up the total amount of milk-solids-not-fat present in the mix to give an ice cream having a higher food value.

In this connection, it is to be noted that there are State enactments in effect which require a minimum contents of total solids. California has a State law which requires ten (10.00) per cent butter fat, and one and six tenths (1.60) pounds of total solids per gallon of ice cream, which was based on a four and a half (4.50) pounds per gallon ice cream, made from an ice cream mix, with ten (10.00) percent butter fat, and total solids content of thirty six (36.00) percent, which would produce an ice cream of four and a half (4.50) pounds per gallon, with one and sixty three (1.63) pounds of total solids, and two and fifty seven (2.57) pounds of water.

A number of States and municipalities have laws standardizing ice cream to a standard weight per gallon. Utah has a law that all ice cream must weigh four and a half (4.50) pounds per gallon. Spokane, Washington, has a law that all ice cream must weigh four and a half pounds per gallon. Kansas once had a State law that all ice cream must weigh four and three quarters (4.75) pounds per gallon.

All ice cream manufacturers realize the importance of a uniform standard weight per unit volume, on all flavors, including vanilla, fruit, chocolate, and nut ice creams.

It has been a long established practice with ice cream manufacturers to draw ice cream from freezers on a given percent of "overrun", regardless of flavor made. Fruits, chocolate, or nuts are added in the freezers to the ice cream mix, thereby increasing the weight per gallon of mix, and increasing the total weight of mix to be frozen.

For instance, we will assume an ice cream manufacturer was using forty (40) quart freezers; usually the total pounds to be frozen in freezer would be fifty (50.00) pounds. The practice has been to add fifty (50.00) pounds of ice cream mix, and from five (5.00) to seven (7.00) pounds of fruits or chocolate syrups, and from three (3.00) to five (5.00) pounds of nuts.

Forty (40) quart freezers will produce on an average about eleven (11) gallons of frozen ice cream, at four and a half (4.50) pounds per gallon, which would be approximately fifty (50.00) pounds of ice cream.

If an operator would use fifty (50.00) pounds of ice cream mix, and from five (5.00) to seven (7.00) pounds of fruits or chocolate syrup, it is plainly seen, he would have an over-load in the freezer to be operated, and while it would be impossible to get any more volume than the capacity of the freezer in question, which would be eleven (11) gallons, the results would be a heavy, soggy ice cream weighing five (5.00) or more pounds per gallon.

This same theory holds true on a high total solids mix, which will weigh from nine and a quarter (9.25) to ten (10.00) pounds per gallon of ice cream mix, depending on the percentage of serum solids, or milk-solids-not-fat, and the percentage of sugar used. These two ingredients increase or decrease the weight of the ice cream, corresponding to the amounts used. Butter fat is the lightest constituent used in ice cream mix, so that an increase or decrease in percentage used, would not increase or decrease the weight per gallon materially. This can be seen by reference to the fololwing tables.

| Percent cream | Specific gravity | Weight per gallon |
|---|---|---|
| 8.00% B F | 1.026 | 8.55 pounds |
| 10.00% B F | 1.025 | 8.52 pounds |
| 12.00% B F | 1.022 | 8.50 pounds |
| 15.00% B F | 1.018 | 8.47 pounds |

*Approximate weight per gallon serum solids and sugar*

| % serum solids | % sugar | Weight per gallon |
|---|---|---|
| 10.00% S S | 13.00% | 9.20 lbs. |
| 11.50% S S | 14.50% | 9.25 lbs. |
| 12.50% S S | 15.50% | 9.50 lbs. |
| 15.00% S S | 16.50% | 9.75 lbs. |
| 20.00% S S | 20.00% | 10.25 lbs. |

It is plainly seen that if an ice cream manufacturer in the State of California maintained his State requirements of one and six tenths (1.60) pounds of total solids, and was using an ice cream mix containing the following percent constituents:

*Ideal mix*

10.00% butter fat
20.00% serum solids
20.00% sugar 50.00% total an ice cream drawn from freezers that became frozen made of the above mix would have two and a quarter (2.25) pounds of total solids, and only two and a quarter (2.25) pounds of water. Ice cream, could, however, be drawn from freezers at four (4.00) pounds per gallon, and still comply with the state standard of total solids; whereas the ice cream manufacturer in Utah or Spokane, Washington, could still maintain his uniform standard weight of four and a half (4.50) pounds per gallon.

In either case the ice cream mix and the finished product ice cream, would cost less per gallon, or per pound, than ice cream manufactured from a typical mix, having 12.00% butter fat, 11.00% serum solids (milk-solids-not-fat), 14.50% sugar, 0.50% gelatine, and from one half (0.50) to one (1.00) percent egg, or egg compounds, all of which increase the cost of the ice cream mix, without giving an added increase in food value, to speak of.

Serum solids, or milk-solids-not-fat and sugar are the two cheapest ingredients used in ice cream mix. Gelatine and eggs are the two highest ingredients in cost per pound, used in ice cream mix.

Serum solids, or milk-solids-not-fat, in combination with butter fat, have the highest food value of the ingredients used. To illustrate this point, cow's milk is a better balanced food ration than would be cream of from ten (10.00) to fifteen (15.00) percent butter fat. Cow's milk contains on an average about three and three quarters (3.75) percent butter fat and eight and three quarters (8.75) percent serum solids, or milk-solids-not-fat, almost two and one half (2.50) pounds of serum solids or milk-solids-not-fat to one (1.00) pound of butter fat. If it were possible to maintain this ratio as to butter fat and serum solids, or milk-solids-not-fat, in an ice cream mix, we would be approaching near to the ideal stage of an ice cream mix.

Hence the ideal mix referred to would produce an ice cream with a much higher food value and a super quality ice cream using only milk products, sugar and flavors, at no greater cost per unit volume, than an ice cream manufactured from the typical mix.

It follows, therefore, that the higher the percentage of total solids present in an ice cream mix, the greater amount of air may be incorporated in the ice cream, imparting thereto its body and smooth texture. Hitherto, when it was attempted to build up the amount of total solids present in a mix, a sandy or gritty ice cream resulted, as pointed out hereinbefore.

Of recent years, a frozen comestible bar consisting of an ice cream coated with chocolate has become quite popular. A bar of this type can be made quite rich in food value by the use of my process.

Due to the colloidal qualities which are imparted to the mix, which is improved with my agent, the necessity of using gelatine and egg in any form is dispensed with.

It is to be remembered that the minimum amount of my improving agent to be used with any ice cream mix is that sufficient to neutralize any lactic acid which may be present, inasmuch as has been pointed out, lactic acid acts as a flocculating agent.

In use, any desired amount of milk-solids-not-fat may be added to a mix. My improving agent is then added and the mix tested for acidity by the use of phenol phthalein or litmus paper, until an alkaline reaction is obtained in order to insure that all of the lactic acid present has been neutralized. The mix is then agitated and pasteurized. After the mix has been run through the homogenizer or viscolizer and cooled, it is brought to a low temperature preparatory to running it through the ice cream freezer. The amount of the mix that is run into the freezer will depend on the weight per gallon that is desired. The ice cream is then whipped and frozen in the freezer. During the freezing process, samples of ice cream being frozen may be withdrawn from the freezer from time to time and tested to determined the specific gravity or weight per gallon of the ice cream. A convenient means of determining the weight per unit of volume is by use of a device described and claimed in United States Letters Patent to Ernest D. Fear, No. 1,578,591. When the mix has been whipped to the desired weight per unit of volume and frozen, it is withdrawn from the freezer.

It will be seen that I have accomplished the objects of my invention. I am enabled to make a superior quality ice cream having a high food value by building up the ice cream mix with the addition of milk-solids-not-fat without the danger of getting a sandy or gritty ice cream.

I am enabled by the use of my process to eliminate the necessity of providing an ageing vat with the result that a considerable amount of expense and floor space are saved. Furthermore, a manufacturer of ice cream is enabled with the use of my process to meet a sudden demand without the necessity of keeping large quantities of the mix in the ageing stage.

It is obvious that, by the use of my improving agent, a comestible frozen bar may be confected, having a percentage of total solids of as high as 75%. It is manifest that a comestible bar of this nature will have a very high food value. I propose to make my bar from milk or milk concentrates, sugar, and flavoring such as chocolate, fruits or nuts, together with my improving agent. After this bar has been frozen it may be coated with chocolate or other flavoring in the customary manner, if desired.

It is to be noted that the sourness of bread is caused by the lactic acid phosphate and phosphoric acid formed by the decomposition of the lactose of milk sugar present in the milk concentrate used in the dough. The sodium chloride present may react with the phosphoric acid to produce hydrochloric acid. My improving agent may be used to prevent sourness in bread by admixing with the milk concentrates or milk used in the dough.

It is to be understood that cretain features, subcombinations and operations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Inasmuch as many of the phenomena of colloidal chemistry are not at present fully understood, it is to be remembered that I do not wish to be limited by the theories expressed herein.

Having thus described my invention, what I claim is:

1. An improving agent for use in the confection of frozen comestibles consisting of dextrose and an alkaline deflocculating agent selected from the following group: calcium oxide and magnesium oxide.

2. An improving agent for use in the confection of frozen comestibles consisting of dextrose and magnesium oxide.

3. An improving agent for use in the confection of frozen comestibles consisting of dextrose and calcium oxide.

4. An improving agent for use in the confection of frozen comestibles including 10 to 100 parts of dextrose and 1 to 2 parts of calcium oxide.

5. A milk product consisting of in combination a milk concentrate, dextrose and an added alkaline deflocculating agent selected from the following group: calcium oxide and magnesium oxide.

6. A milk product consisting of in combination a milk concentrate, dextrose and added calcium oxide serving as a deflocculating agent.

7. A continuous process of manufacturing ice cream including the steps of forming a mix, adding an improving agent containing dextrose and an alkaline deflocculating agent selected from the class consisting of calcium oxide and magnesium oxide until the acidity of the mix is neutralized, homogenizing the improved mix and subjecting said mix to a simultaneous agitating and freezing operation whereby ice cream is formed.

8. A process for making a frozen comestible bar including the steps of forming a mix having a high percentage of total solids, neutralizing said mix with an improving agent containing dextrose and a deflocculating agent selected from the class consisting of calcium oxide and magnesium oxide, homogenizing said mix, agitating and freezing said mix and subsequently extruding said frozen product to form a food bar having a high food value.

9. An improving agent for use in the confection of comestibles consisting of dextrose and a deflocculating agent of the class consisting of magnesium oxide and calcium oxide.

10. An improving agent for use in the confection of frozen comestibles including 10 to 100 parts of sugar and 1 to 2 parts of an alkaline deflocculating agent selected from the class of magnesium oxide and calcium oxide.

11. A milk product including in combination a milk concentrate, a sugar, and an added alkaline deflocculating agent selected from the natural compounds present in milk which are adapted to deflocculate the casein present in the milk concentrate.

12. An ice cream mix comprising in combination a milk concentrate, sugar and an added alkaline deflocculating agent selected from a class consisting of the alkaline substances naturally present in milk, said mix having a serum solids content between 13% and 20% by weight.

13. A dry compound adapted to be used for the confection of ice cream comprising in combination milk powder intimately combined with sugar, and an alkaline deflocculating agent selected from the class consisting of calcium and magnesium oxide.

ERNEST D. FEAR.